United States Patent
Tse et al.

(10) Patent No.: US 7,215,933 B1
(45) Date of Patent: May 8, 2007

(54) LOCAL TRANSMITTER OUTPUT POWER CONTROL SYSTEM FOR WIRELESS APPLICATIONS

(75) Inventors: Lawrence Tse, Fremont, CA (US); Shuran Wei, San Jose, CA (US); George Chien, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 404 days.

(21) Appl. No.: 10/253,364

(22) Filed: Sep. 24, 2002

(51) Int. Cl.
  *H04Q 11/12* (2006.01)
(52) U.S. Cl. ............ 455/127.2; 455/126; 375/296
(58) Field of Classification Search ............ 455/126, 455/115.1, 127.1, 2, 129, 232.1, 234; 330/254, 330/279, 260; 375/296, 297
See application file for complete search history.

(56) References Cited

U.S. PATENT DOCUMENTS

| | | | |
|---|---|---|---|
| 4,031,469 A | 6/1977 | Johnson | |
| 5,212,826 A | 5/1993 | Rabe et al. | |
| 5,548,840 A | 8/1996 | Heck | |
| 5,724,653 A | 3/1998 | Baker et al. | |
| 5,752,171 A * | 5/1998 | Akiya | 455/126 |
| 5,805,988 A | 9/1998 | Clayton et al. | |
| 5,859,559 A | 1/1999 | Hong et al. | |
| 5,886,547 A | 3/1999 | Durec et al. | |
| 6,081,701 A | 6/2000 | Norimatsu | |
| 6,118,811 A | 9/2000 | Narumi et al. | |
| 6,122,497 A | 9/2000 | Gilbert | |
| 6,324,228 B1 | 11/2001 | Millward et al. | |
| 6,366,622 B1 | 4/2002 | Brown et al. | |
| 6,560,447 B2 | 5/2003 | Rahman et al. | |
| 6,639,447 B2 | 10/2003 | Manku et al. | |
| 6,650,883 B1 | 11/2003 | Stephane et al. | |
| 6,735,420 B2 * | 5/2004 | Baldwin | 455/127.2 |
| 2001/0028275 A1 * | 10/2001 | Matsugatani et al. | 330/281 |
| 2002/0015458 A1 * | 2/2002 | Van Sinderen | 375/345 |
| 2003/0003891 A1 | 1/2003 | Kivekas et al. | |
| 2003/0027531 A1 | 2/2003 | Malhi et al. | |
| 2003/0069049 A1 * | 4/2003 | Poranen et al. | 455/572 |
| 2003/0129958 A1 | 7/2003 | Behzad | |
| 2003/0228858 A1 | 12/2003 | Zhang et al. | |
| 2004/0043742 A1 | 3/2004 | Beumer | |

OTHER PUBLICATIONS

IEEE Standard 802.11B, Supplement to IEEE Standard for Information technology—Telecommunications and information exchange beween systems—Local and metropolitan area networks—Specific requirements, Part 11: Wireless LAN Medium Access Control (MAC) and Physical Layer (PHY) specifications: Higher-Speed Physical Layer Extension in the 2.4 GHz Band, 1999 Edition, pp. 1-89.

(Continued)

*Primary Examiner*—Edward F. Urban
*Assistant Examiner*—Tu X. Nguyen (57) ABSTRACT

A local transmitter power control system for a radio frequency transmitter of a wireless local area network device includes a transmitter that transmits RF signals. A sensor detects at least one of amplitude and power of said RF signals and generates a sensed signal. The gain adjuster includes a comparator that receives an amplitude signal and/or a power signal detected by the sensor. The comparator compares the amplitude and/or power to the threshold signal. The gain of the transmitter is adjusted accordingly.

80 Claims, 8 Drawing Sheets

OTHER PUBLICATIONS

U.S. Appl. No. 10/388,920, filed Mar. 14, 2003.
U.S. Appl. No. 10/292,087, filed Nov. 11, 2002.
U.S. Appl. No. 10/238,475, filed Sep. 10, 2002, Tse, Lawrence et al.
IEEE Standard P802.11G, Draft Supplement to Standard for Information technology—Telecommuncations and information exchange beween systems—Local and metropolitan area networks—Specific requirements, Part 11: Wireless LAN Medium Access Control (MAC) and Physical Layer (PHY) specifications: Further Higher Data Rate Extension in the 2.4 GHz Band, Apr. 2003, pp. 1-69.

* cited by examiner

LOCAL TRANSMITTER OUTPUT POWER CONTROL SYSTEM FOR WIRELESS APPLICATIONS

FIELD OF THE INVENTION

The present invention relates to transmitter output power control systems, and more particularly to local transmitter output power control systems for wireless applications.

BACKGROUND OF THE INVENTION

Figure 1:
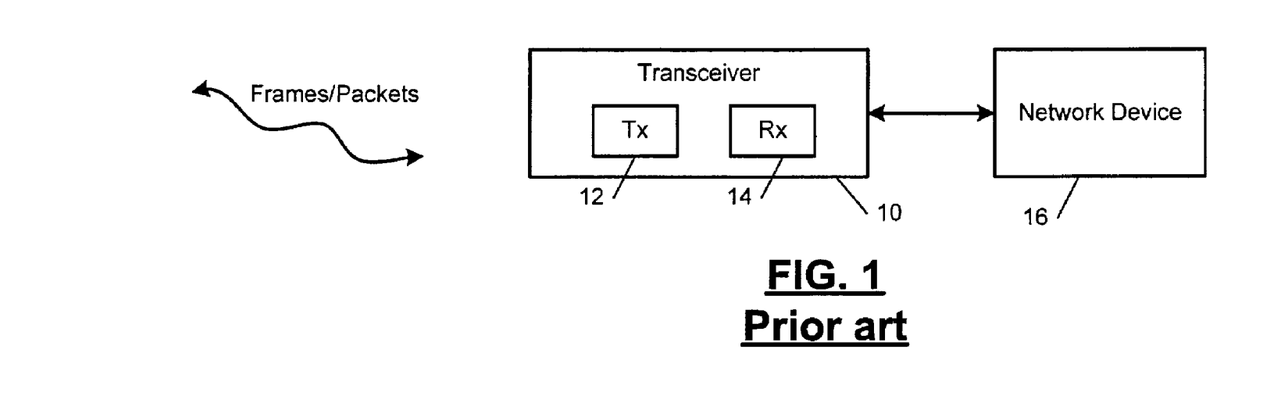
FIG. 1 is a functional block diagram of an exemplary wireless transceiver according to the prior art.

Referring now to FIG. 1, a wireless transceiver 10 is shown and includes a transmitter 12 and a receiver 14. The wireless transceiver 10 may be used in a local area network (LAN) and may be attached to a Baseband Processor (BBP) and a Media Access Controller (MAC) in either a station or an Access Point (AP) configuration. A network interface card (NIC) is one of the various "STATION" configurations. The NIC can be connected to a networked device 16 such as a laptop computer, a personal digital assistant (PDA) or any other networked device. When the transceiver 10 is attached to an access point (AP) MAC, an AP is created. The AP provides network access for WLAN stations that are associated with the transceiver 10.

The wireless transceiver 10 transmits and receives frames/packets and provides communication between two networked devices. In AdHoc mode, the two devices can be two laptop/personal computers. In infrastructure mode, the two devices can be a laptop/personal computer and an AP.

Figure 2A:
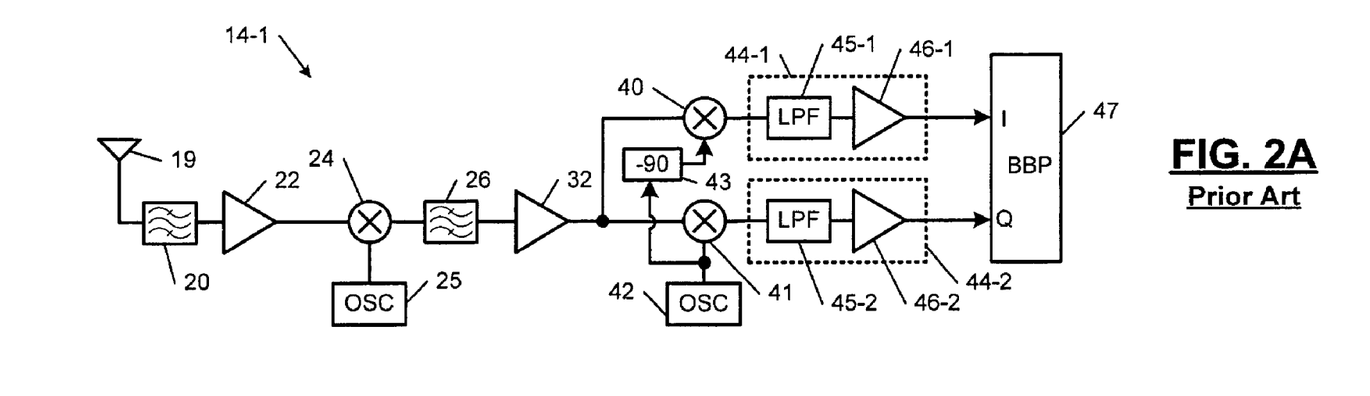
FIG. 2A is a functional block diagram of an exemplary super-heterodyne receiver architecture according to the prior art.

There are multiple different ways of implementing the transmitter 12 and the receiver 14. For purposes of illustration, simplified block diagrams of super-heterodyne and direct conversion transmitter and receiver architectures will be discussed, although other architectures may be used. Referring now to FIG. 2A, an exemplary super-heterodyne receiver 14-1 is shown. The receiver 14-1 includes an antenna 19 that is coupled to an optional RF filter 20 and a low noise amplifier 22. An output of the amplifier 22 is coupled to a first input of a mixer 24. A second input of the mixer 24 is connected to an oscillator 25, which provides a reference frequency. The mixer 24 converts radio frequency (RF) signals to intermediate frequency (IF) signals.

An output of the mixer 24 is connected to an optional IF filter 26, which has an output that is coupled to an automatic gain control amplifier (AGCA) 32. An output of the AGCA 32 is coupled to first inputs of mixers 40 and 41. A second input of the mixer 41 is coupled to an oscillator 42, which provides a reference frequency. A second input of the mixer 40 is connected to the oscillator 42 through a −90° phase shifter 43. The mixers 40 and 41 convert the IF signals to baseband (BB) signals. Outputs of the mixers 40 and 41 are coupled to BB circuits 44-1 and 44-2, respectively. The BB circuits 44-1 and 44-2 may include low pass filters (LPF) 45-1 and 45-2 and gain blocks 46-1 and 46-2, respectively, although other BB circuits may be used. Mixer 40 generates an in-phase (I) signal, which is output to a BB processor 47. The mixer 41 generates a quadrature-phase (Q) signal, which is output to the BB processor 47.

Figure 2B:
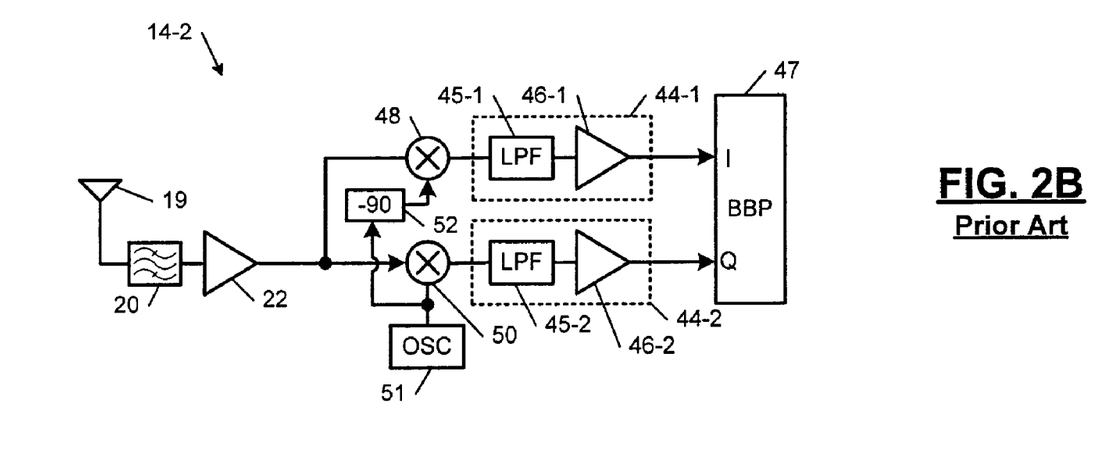
FIG. 2B is a functional block diagram of an exemplary direct receiver architecture according to the prior art.

Referring now to FIG. 2B, an exemplary direct receiver 14-2 is shown. The receiver 14-2 includes the antenna 19 that is coupled the optional RF filter 20 and to the low noise amplifier 22. An output of the low noise amplifier 22 is coupled to first inputs of RF to BB mixers 48 and 50. A second input of the mixer 50 is connected to oscillator 51, which provides a reference frequency. A second input of the mixer 48 is connected to the oscillator 51 through a −90° phase shifter 52. The mixer 48 outputs the I-signal to the BB circuit 44-1, which may include the LPF 45-1 and the gain block 46-1. An output of the BB circuit 44-1 is input to the BB processor 47. Similarly, the mixer 50 outputs the Q signal to the BB circuit 44-2, which may include the LPF 45-2 and the gain block 46-2. An output of the BB circuit 44-2 is output to the BB processor 47.

Figure 3A:
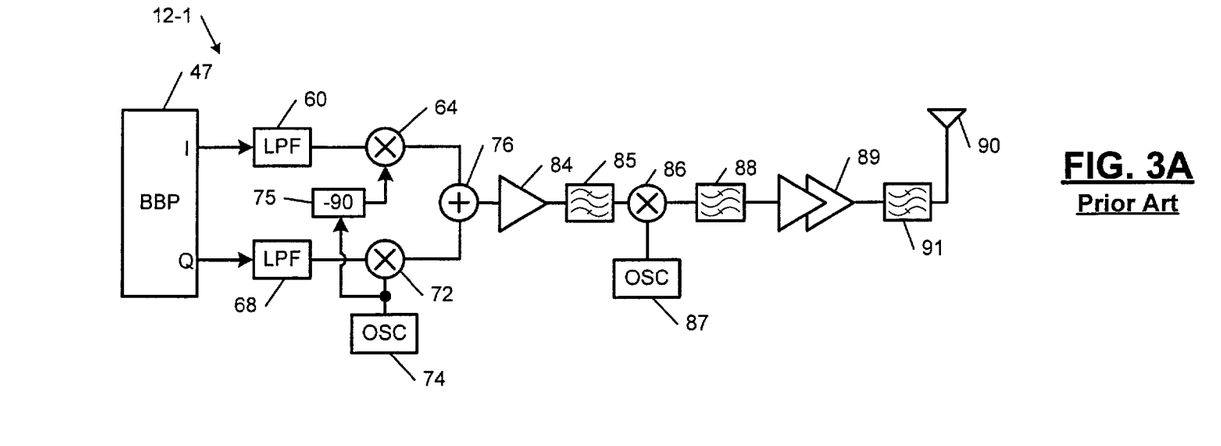
FIG. 3A is a functional block diagram of an exemplary super-heterodyne transmitter architecture according to the prior art.

Referring now to FIG. 3A, an exemplary super-heterodyne transmitter 12-1 is shown. The transmitter 12-1 receives an I signal from the BB processor 47. The I signal is input to a LPF 60 that is coupled to a first input of a BB to IF mixer 64. A Q signal of the BB processor 47 is input to a LPF 68 that is coupled to a first input of a BB to IF mixer 72. The mixer 72 has a second input that is coupled to an oscillator 74, which provides a reference frequency. The mixer 64 has a second input that is coupled to the oscillator through a −90° phase shifter 75.

Outputs of the mixers 64 and 72 are input to a summer 76. The summer 76 combines the signals into a complex signal that is input to a variable gain amplifier (VGA) 84. The VGA 84 is coupled to an optional IF filter 85. The optional IF filter 85 is connected to a first input of an IF to RF mixer 86. A second input of the mixer 86 is connected to an oscillator 87, which provides a reference frequency. An output of the mixer 86 is coupled to an optional RF filter 88. The optional RF filter 88 is connected to a power amplifier 89, which may include a driver. The power amplifier 89 drives an antenna 90 through an optional RF filter 91.

Figure 3B:
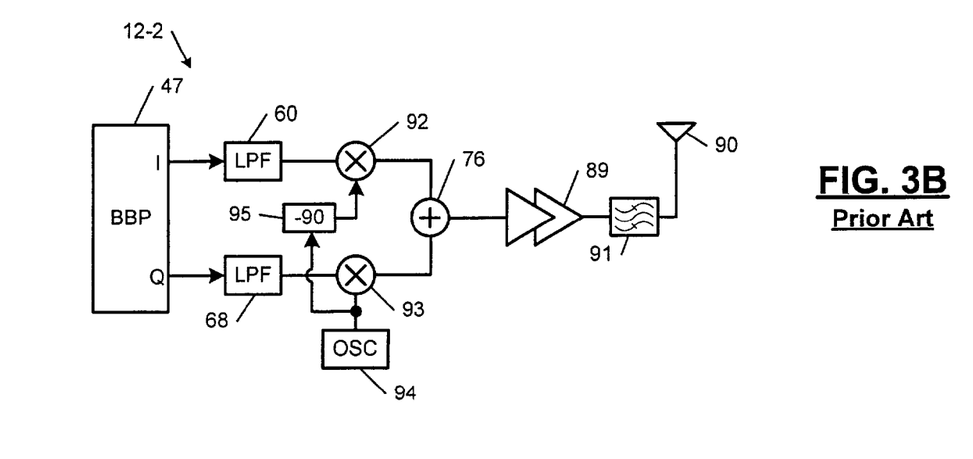
FIG. 3B is a functional block diagram of an exemplary direct transmitter architecture according to the prior art.

Referring now to FIG. 3B, an exemplary direct transmitter 12-2 is shown. The transmitter 12-2 receives an I signal from the BB processor 47. The I signal is input to the LPF 60, which has an output that is coupled to a first input of a BB to RF mixer 92. A Q signal of the BB processor 47 is input to the LPF 68, which is coupled to a first input of a BB to RF mixer 93. The mixer 93 has a second input that is coupled to an oscillator 94, which provides a reference frequency. The mixer 92 has a second input that is connected to the oscillator 94 through a −90° phase shifter 95. Outputs of the mixers 92 and 93 are input to the summer 76. The summer 76 combines the signals into a complex signal that is input the power amplifier 89. The power amplifier 89 drives the antenna 90 through the optional RF filter 91. The RF and IF filters in FIGS. 2A, 2B, 3A and 3B may be implemented on-chip or externally.

The transmitter 12 typically includes circuit elements that are implemented with both on-chip integrated circuits and off-chip components. On-chip circuit elements are typically active and are implemented using modern semiconductor processes. The on-chip circuit elements typically include mixers, variable gain amplifiers, power amplifiers, low pass filters, etc. Off-chip circuit elements are passive and typically include filters and matching networks. Due to semiconductor process variations and sensitivity of the on-chip transceiver components to environmental variations, such as temperature, compensation of the on-chip circuit elements is performed to improve transceiver performance. The gain of the circuit elements, which also depends upon the external circuit elements, cannot be easily compensated.

On-chip circuit elements can be compensated to provide finite and controlled performance and characteristics. However, the gain of the transmitter also depends upon the external circuit elements. If certain transistor technologies are employed (such as CMOS), the gain of the transmitter may also vary with temperature.

For example, an external filter may have attenuation that varies from −8 dB to −11 dB. The capacitance of matching circuits may vary +/−0.25 pF. The inductance of the matching circuits may vary +/−10%. The external filter may have insertion loss that varies from −1.5 dB to −2.5 dB. As a result of these variations, the output power delivered by the power amplifier may vary 3 to 6 dB. For example, a 20 dBm output signal at 100 mW can vary to a 14 dBm signal at 25 mW, which is an unacceptable variation.

SUMMARY OF THE INVENTION

A radio frequency (RF) transmitter power control system and method according to the present invention for a transmitter of a wireless local area network device includes a transmitter that transmits RF signals. A sensor detects at least one of amplitude and power of the RF signals and generates a sensed signal. A gain adjuster compares the sensed signal to a threshold signal and adjusts a gain and/or output power level of the transmitter.

In other features, the sensor detects an amplitude output by the transmitter and generates an amplitude signal. The gain adjuster includes a comparator that receives the amplitude signal and that compares the amplitude signal to the threshold signal. Alternately, the sensor detects the power output level of the transmitter and generates an output power level signal. The gain adjuster includes a comparator that receives the output power level signal and that compares the output power level signal to the threshold signal.

In still other features, the sensor senses the amplitude and/or the power of a first packet and the gain adjuster adjusts the gain and/or the output power level of the transmitter for a subsequent packet.

A radio frequency (RF) transceiver for a wireless local area network device according to the present invention includes a transmitter that transmits RF signals. A RF transmitter power control system adjusts a gain and/or an output power level of the transmitter based on amplitude and/or power of the transmitted RF signals.

In other features, transmitter includes a variable gain amplifier. The RF transmitter power control system adjusts a gain of the variable gain amplifier. The RF transmitter power control system includes a sensor that detects the amplitude and/or the power of the RF signal and that generates a sensed signal. A gain adjuster compares the sensed signal to a threshold signal and adjusts the gain of the transmitter.

In other features, the sensor detects an amplitude output by the transmitter and generates an amplitude signal. The gain adjuster includes a comparator that receives the amplitude signal and that compares the amplitude signal to the threshold signal. Alternately, the sensor detects power output by the transmitter and generates a power output level signal. The gain adjuster includes a comparator that receives the power output level signal and that compares the power output level signal to the threshold signal.

In still other features, the RF transmitter power control system senses the amplitude and/or the power of a first packet and the RF transmitter power control system adjusts the gain and/or output power level of the transmitter for a subsequent packet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

Figure 4:
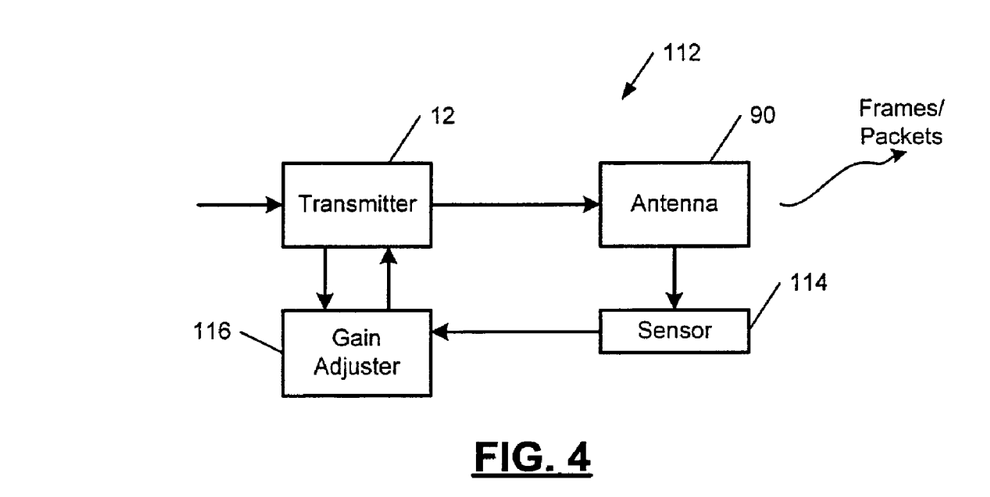
FIG. 4 is a functional block diagram of a radio frequency (RF) transmitter power control system according to the present invention.
Figure 5A:
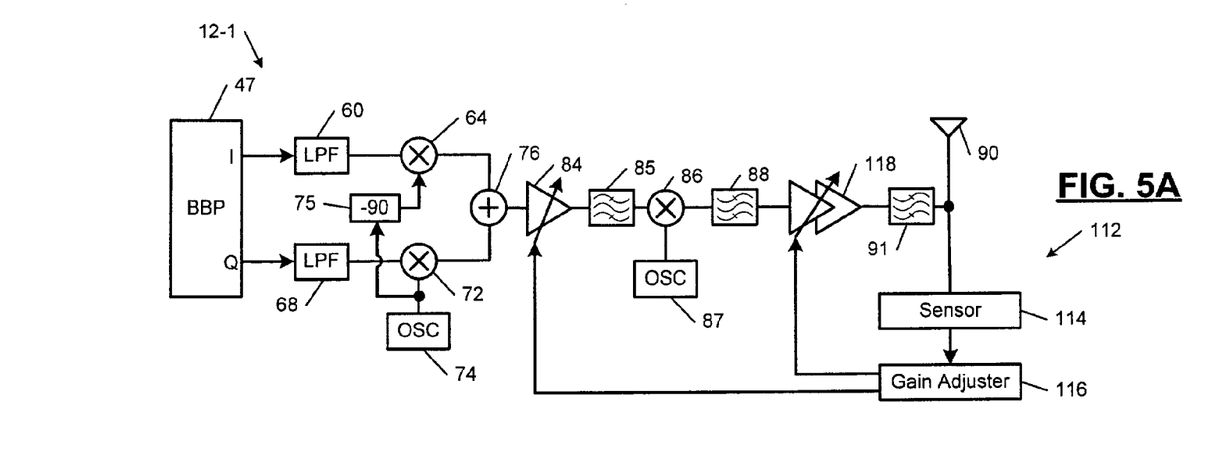
FIG. 5A is a functional block diagram of the transmitter power control system implemented on the transmitter architecture of FIG. 3A.
Figure 5B:
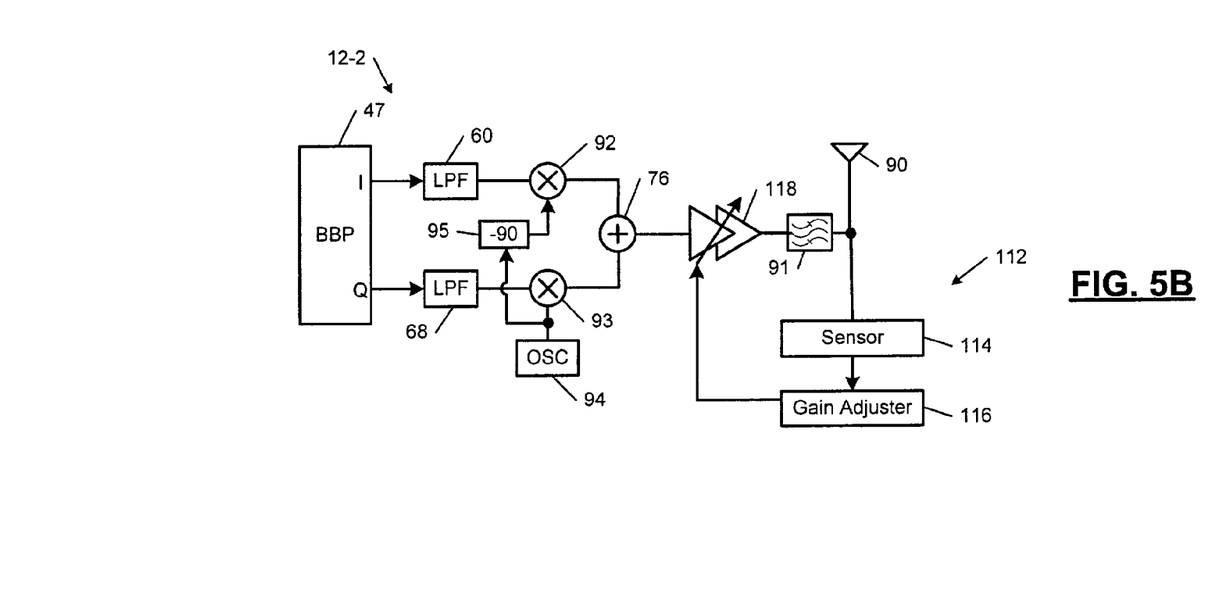
FIG. 5B is a functional block diagram of the transmitter power control system implemented on the transmitter architecture of FIG. 3B.

Referring now to FIGS. 4, 5A and 5B, a transmitter power control system according to the present invention is shown generally at 112. The transmitter power control system adjusts the gain and/or output power level of the transmitter locally. The packet-based transmitter power control system 112 includes a sensor 114 that senses amplitude and/or power output of the power amplifier. The sensor 114 outputs a sensed signal based on the amplitude/power to a gain adjuster 116. In a simplified form, the gain adjuster 116 includes a comparator that compares the sensed signal to a threshold signal and adjusts the transmitter path gain and/or output power level. An output of the comparator is provided to the transmitter gain adjuster 116 to adjust the gain and/or output power level of the variable gain amplifier 118 and/or the variable gain amplifier 84 as can be seen in FIGS. 5A and 5B. The transmitter power control system can be implemented in analog or digital form. The transmitter can be packet-based or can use other timing for making transmitter gain adjustments.

In many wireless communication systems such as wireless local area network (WLAN), the transmitter outputs a pre-amble and then data. The receiver gain is adjusted based on the received signal strength. The receiver amplifies the incoming signal to a desired level to optimize Signal to Noise Ratio (SNR) and dynamic range of the receiver. The gain adjustment is typically performed during the preamble. The adapted gain setting is constant during data reception. If the output power of a transmitter changes between the preamble and data, the receiver encounters dynamic range problems and/or can suffer from SNR degradation. The output power of the transmitter according to the present invention remains constant throughout a packet and is adjusted in between packets to provide packet-based power control.

Figure 6:
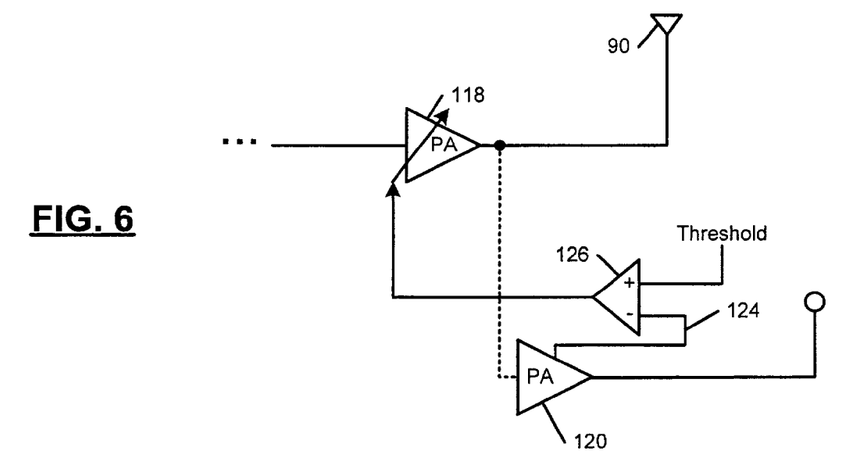
FIG. 6 illustrates a transmitter power control system for an external power amplifier.

Referring now to FIG. 6, the transmitter 12 may be connected to an external power amplifier 120. The external power amplifier 120 includes an amplitude and/or power sensing output that generates an amplitude or power sensing signal 124, which is proportional to the amplitude and/or output power level. The amplitude or power sensing signal 124 is input to a comparator 126. A threshold signal is also input to the comparator 126. An output of the comparator 126 is provided to the transmitter gain adjuster to adjust the gain and/or output power level of the variable gain amplifier 118 up or down depending on the output polarity of the comparator 126.

Figure 7:
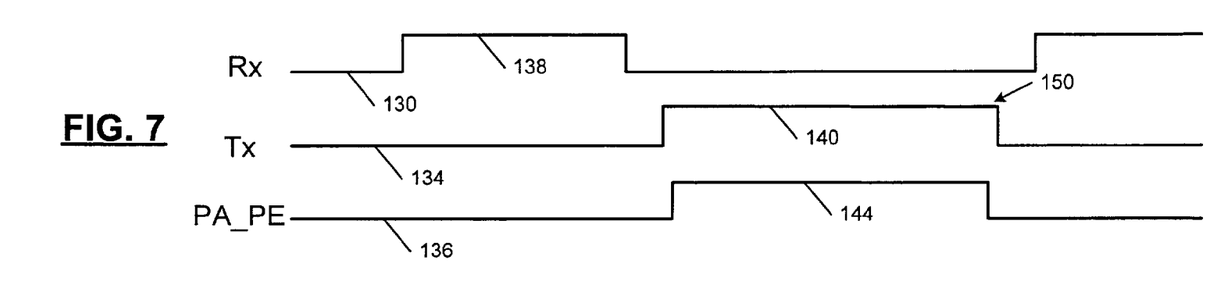
FIG. 7 is a waveform diagram illustrating transmitter, receiver, and power amplifier enable signals.

WLAN communications are half-duplex. In other words, the receive and transmit functions occur at different times. Referring now to FIG. 7, receiver, transmitter and power amplifier enable signals 130, 134, and 136, respectively, are shown. The receiver 14 is enabled at 138 when the enable signal 130 is high. The transmitter 12 is enabled at 140 when the enable signal 134 is high. The power amplifier is enabled at 144 when the PA_PE signal 136 is high. In one embodiment, the transmitter amplitude and/or power is sampled just before the transmitter enable signal 134 goes low as indicated at 150, although other sampling points may be used. Based on the sensed transmitter signal amplitude and/or power level, the gain adjuster 104 adjusts a gain of the transmitter.

Figures 8, 9:
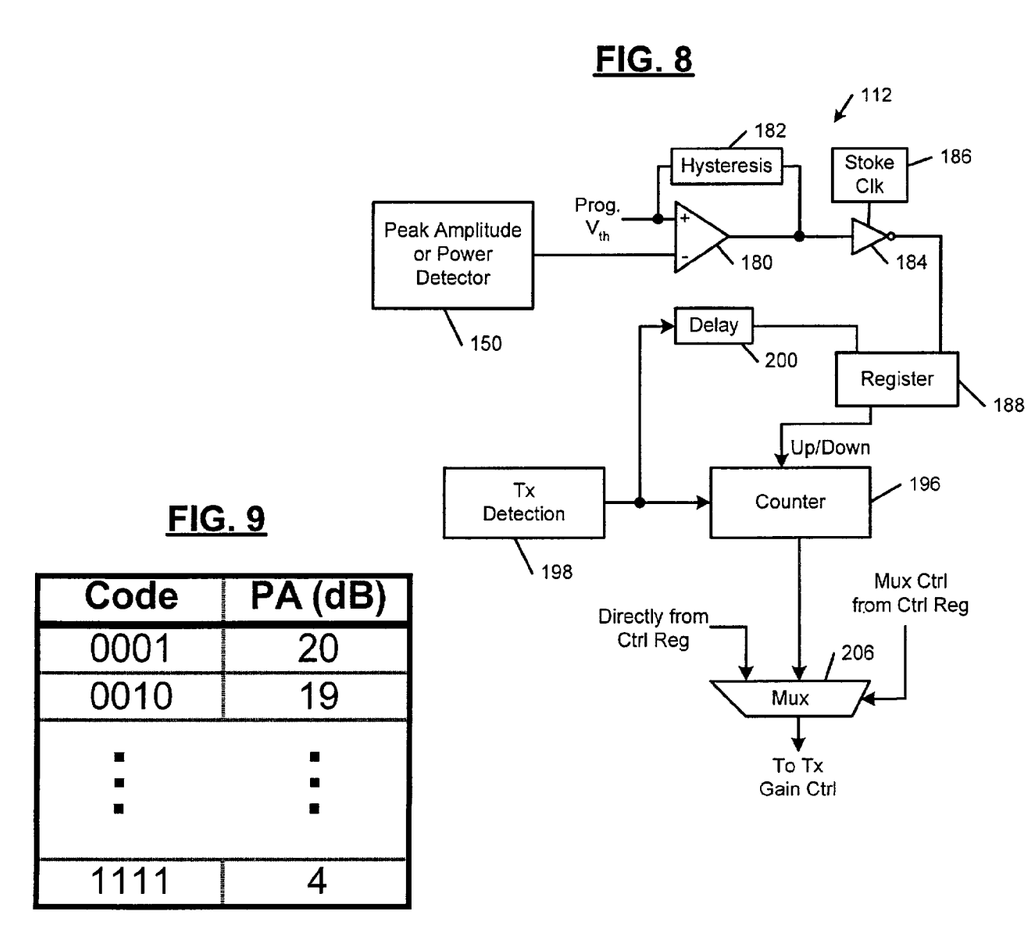
FIG. 8 illustrates an exemplary implementation of the transmitter power control system according to the present invention.
FIG. 9 is a table of codes and corresponding power amplifier levels for the exemplary implementation of FIG. 8.

Referring now to FIG. 8, an exemplary implementation of the transmitter power control system 112 is shown. The control system 112 includes an amplitude or power detector 150 that generates an amplitude or power signal that is input to an inverting input of a differential amplifier 180. A non-inverting input of the differential amplifier 180 is coupled to a programmable threshold $V_{th}$. A hysteresis circuit 182 is coupled to the non-inverting input of the differential amplifier 180. An output of the differential amplifier 180 is connected to the hysteresis circuit 182 and to a strobe latch 184, which has an input coupled to a strobe clock 186. An output of the latch 184 is coupled to a register 188, which can also be implemented in other ways.

An output of the register 188 is input to a counter 196. The counter 196 is preferably an up/down counter. A transmit detection circuit 198 outputs a transmit detect signal to the counter 196 and to a delay circuit 200. In a one embodiment, the transmit detection circuit 198 is high during transmission. An output of the delay circuit 200 is input to the register 188. An output from the counter 196 is input to a multiplexer 206. Additional inputs to the multiplexer 206 include control signals from control registers. An output of the multiplexer 206 is input to a transmitter gain control circuit, such as the variable gain amplifier 118 in FIGS. 5A, 5B and 6.

When powered up, the transceiver 10 is typically in the receive mode and the transmitter 12 is in "sleep" mode. The transceiver 10 initially transmits with a default gain setting for a specified power output level. The default gain setting is stored in the counter 196. A lookup table may be used to associate counter values with gain settings, as can be seen in FIG. 9.

The control system 112 adjusts the gain setting of the transmitter either up or down depending upon the output of the sensor 114. For example, the sensor 114 may detect signal amplitude and/or power. The counter 196 is preferably updated once per packet during transmission. Gain adjustment is made prior to a subsequent packet. As can be appreciated, a few packets may be required before the gain and/or the output power level of the transmitter path settles to an appropriate gain setting.

In one embodiment, the sensor 114 is used to peak detect the output level of the power amplifier 118. The detected peak value is compared to the programmable threshold value (that is input to the differential amplifier 180). If the detected peak is higher than the threshold, the output of the differential amplifier 180 changes state, for example from "0" to "1".

When the differential amplifier 180 changes state, the value of "1" is stored in the register 188 to indicate that the signal amplitude or power is larger than desired during the transmission of the current packet. At the end of the current transmission (i.e. as transceiver is exiting the transmitter mode), the up-down counter 196 will be updated depending on the state of the output of the register 188. In other words, the state of the output of the register 188 is the up-down control signal for the counter 196. It is possible that the output power will alternate between two adjacent gain settings (or output power levels) for multiple consecutive packets.

The output of the differential amplifier 180 is input to the register 188. The output of the register 188 is the up/down indicator for the counter 196 (for example, 1=Up and 0=Down). When the output of the latch=1/0, the up/down counter 196 counts up/down by a single count at the end of the transmitter enable signal. If the off-chip power amplifier 120 is used, then the power amplifier amplitude and/or power output is used as an input. An amplitude detect circuit typically includes an external capacitor that holds a peak value, an average value, or a time-based value. The implementation scheme as described above will result in an average output power meeting a desired threshold value. However, the output power may fluctuate between two power levels around the desired threshold value. Alternately, instead of adjusting the output power every packet, the output power can be updated once every so many packets that indicate the same up/down direction. For example, the output power level can be update after three (or any other number of) packets indicate up (or down) power adjustment is required. This type of control will minimize the frequency of output power adjustments.

Figure 10A:
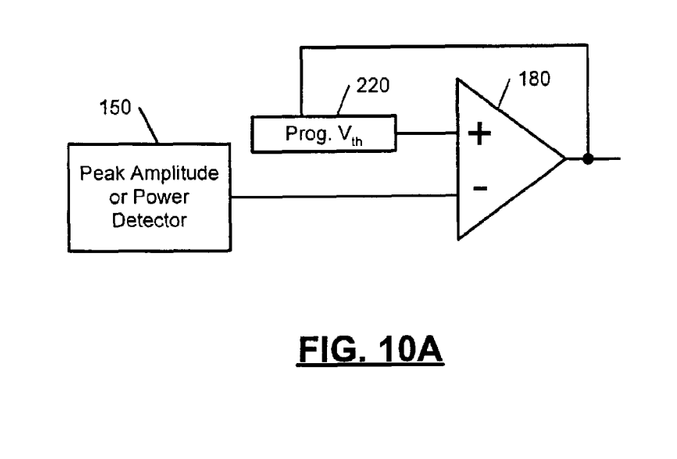
FIG. 10A illustrates an alternate embodiment including a programmable threshold.

In another exemplary implementation, the desired threshold value provided to the differential amplifier 180 surrounds the desired output power. Referring now to FIG. 10A, the peak amplitude or power output signal is input to the differential amplifier 180. A threshold circuit 220 generates a programmable threshold $V_{th}$. First and second thresholds $V_{th1}$ and $V_{th2}$ are defined as follows: $V_{th1} < V_{th}$ (desired) $< V_{th2}$.

If the current $V_{th}$ is equal to $V_{th1}$ and the signal is larger than $V_{th1}$, then $V_{th}$ is set equal to $V_{th2}$ for the next packet. If the output signal is less than $V_{th2}$ for the next packet, the output power will not be adjusted and $V_{th}$ is reset to $V_{th1}$ for the next packet. If the output signal is greater than $V_{th2}$, output power is reduced (reduce gain and/or signal level) and $V_{th}$ is not changed ($V_{th2}$).

If the current $V_{th}$ is equal to $V_{th2}$ and the output signal is less than $V_{th2}$, then $V_{th}$ is set equal to $V_{th1}$ for the next packet. If the output signal is greater than $V_{th1}$ for the next packet, then the output power will not be adjusted and $V_{th}$ is reset to $V_{th2}$ for the next packet. If the output signal is less than $V_{th1}$, output power is increased (increase gain and/or signal level) and $V_{th}$ is not changed ($V_{th1}$).

Figure 10B:
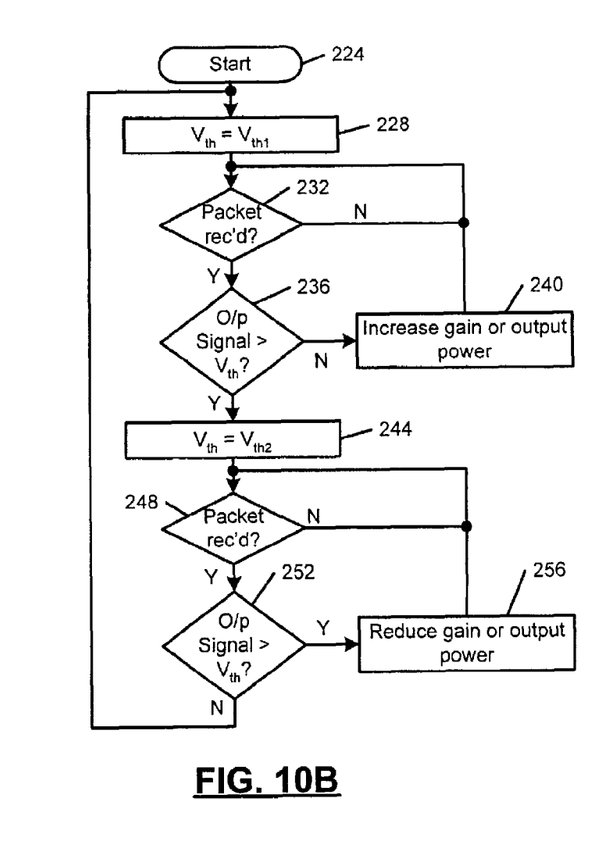
FIG. 10B illustrates steps for setting the threshold in the embodiment shown in FIG. 10A.

Referring now to FIG. 10B, control begins with step 224. In step 228, $V_{th}$ is set equal to $V_{th1}$. In step 232, control determines whether a packet is received. If not, control loops back to step 228. Otherwise control continues with step 236 where control determines whether the output signal is greater than $V_{th}$. If not, control increases gain or output power in step 240 and control returns to step 232. Otherwise, control continues with step 244 and sets $V_{th}$ equal to $V_{th2}$ in step 244. In step 248, control determines whether a packet is received. If not, control loops back to step 248. Otherwise, control determines whether the output signal is greater than $V_{th}$ in step 252. If true, control reduces gain or output power and returns to step 248. Otherwise, control loops to step 228.

Figure 11:
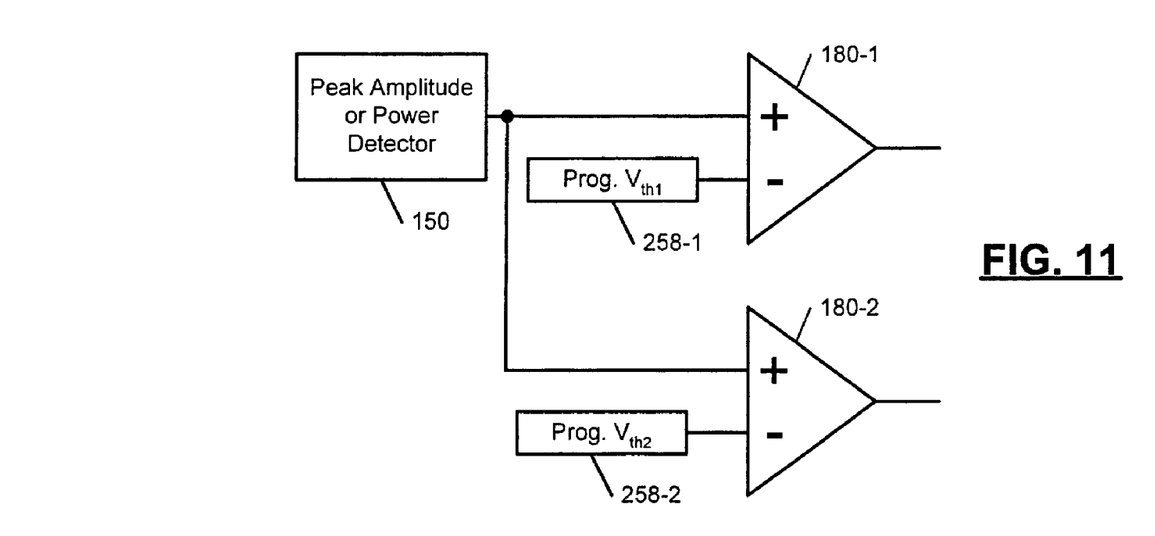
FIG. 11 illustrates multiple comparators for implementing two thresholds to provide hysteresis.

Referring now to FIG. 11, in an alternate implementation two thresholds $V_{th1}$ and $V_{th2}$ are used simultaneously. The first threshold $V_{th1}$ is output by a first threshold circuit 258-1 to the differential amplifier 180-1. The second threshold $V_{th2}$ is output by a second threshold circuit 258-2 to the differential amplifier 180-2. The first and second threshold circuits 258-1 and 258-2 can be combined into one threshold circuit with two outputs. The first and second thresholds can be programmable (as shown) or fixed. If $V_{th1} \leq$ output signal $\leq V_{th2}$, gain or output power adjustments are not made. If the output signal is less than $V_{th1}$, the gain or output power is increased. If the output signal is greater than $V_{th2}$, the gain or output power is decreased.

Figure 12:
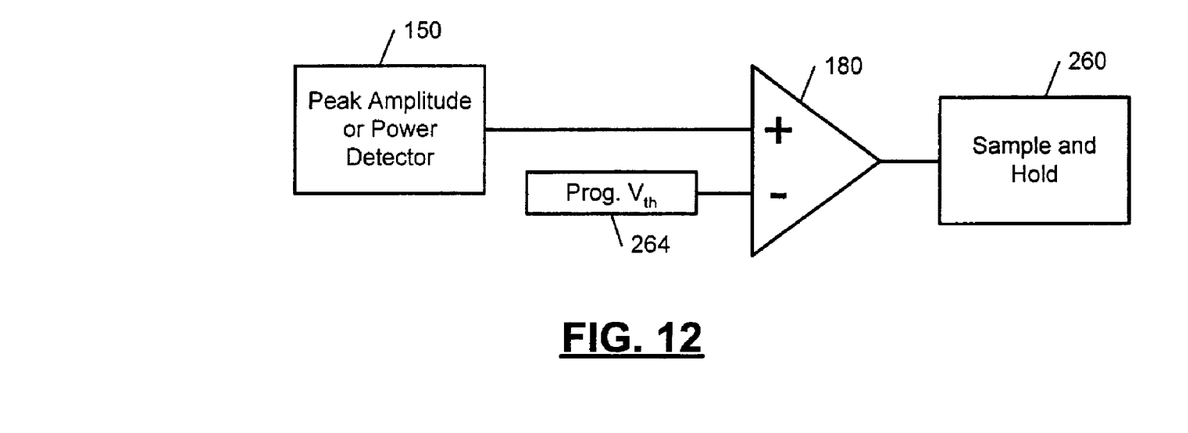
FIG. 12 illustrates a sample and hold circuit and a programmable threshold that switches between two thresholds.

Referring now to FIG. 12, two thresholds can also be implemented sequentially using a sample and hold circuit 260 and a threshold circuit 264. The threshold circuit 264 initially outputs the first threshold $V_{th1}$. In a subsequent period, the threshold circuit 264 outputs the second threshold $V_{th2}$. The thresholds $V_{th1}$ and $V_{th2}$ can be programmable (as shown) or fixed. The sample and hold circuit 260 receives results of the sequential comparison and outputs control signals to increase, decrease or not change the gain and/or output power level.

For example in one clock cycle, the threshold circuit 264 outputs the first threshold $V_{th1}$ to the inverting input. If the output signal is greater than the first threshold $V_{th1}$, the differential amplifier 180 outputs a first state during a first period. If the output signal is less than the first threshold $V_{th1}$, the differential amplifier 180 outputs a second state during the first period.

In a subsequent clock cycle, the output of the threshold circuit 264 is set equal to $V_{th2}$. If the output signal is greater than the second threshold $V_{th2}$, the differential amplifier 180 outputs the first state during a second period. If the output signal is less than the second threshold $V_{th2}$, the differential amplifier 180 outputs the second state during the second period. Based on the outputs during the first and second periods, the sample and hold circuit 260 increases, decreases, or makes no change to the gain and/or output power level.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A radio frequency (RF) transmitter power control system for a transmitter of a wireless local area network device, comprising:
    a transmitter that transmits RF signals;
    a sensor that detects at least one of amplitude and power of said RF signals and that generates a sensed signal; and
    a gain adjuster that compares said sensed signal to a threshold signal and that adjusts at least one of a gain and an output power level of said transmitter,
    wherein said RF transmitter power control system is packet-based and wherein said sensor senses said one of said amplitude and said power of a first packet without adjusting said at least one of said amplitude and said power during said first packet and said gain adjuster adjusts said at least one of said gain and said output power level of said transmitter for a subsequent packet based on said at least one of said sensed amplitude and said sensed power during said first packet.

2. The RF transmitter power control system of claim 1 wherein said sensor detects an amplitude output by said transmitter and generates an amplitude signal.

3. The RF transmitter power control system of claim 2 wherein said gain adjuster includes a comparing circuit that receives said amplitude signal and that compares said amplitude signal to said threshold signal.

4. The RF transmitter power control system of claim 2 wherein said gain adjuster includes a comparing circuit that receives said power signal and that compares said power signal to said threshold signal.

5. The RF transmitter power control system of claim 1 wherein said sensor detects power output by said transmitter and generates a power signal.

6. The RF transmitter power control system of claim 1 further comprising a counter for storing a current gain of said transmitter, wherein said gain adjuster compares said sensed signal to said threshold signal and at least one of increments and decrements said counter.

7. The RF transmitter power control system of claim 1 wherein said gain adjuster includes:
    a comparing circuit having one input that communicates with said sensed signal; and
    a threshold circuit that communicates with another input of said comparing circuit and that selects and outputs one of a first threshold value and a second threshold value for each packet to another input of said comparing circuit.

8. The RF transmitter power control system of claim 7 wherein said threshold circuit sets said threshold signal equal to a first threshold, wherein said sensed signal is compared to said threshold signal, wherein if said sensed signal is less than said threshold signal, said at least one of a gain and an output power level is increased, and wherein if said sensed signal is greater than said threshold signal, said threshold circuit sets said threshold signal equal to a second threshold that is greater than said first threshold.

9. The RF transmitter power control system of claim 8 wherein if said sensed signal is less than said threshold signal, said threshold circuit sets said threshold signal equal to said first threshold, and wherein if said sensed signal is greater than said threshold signal, said at least one of said gain and said output power level is increased.

10. The RF transmitter power control system of claim 1 wherein said gain adjuster simultaneously compares said sensed signal to first and second thresholds.

11. The RF transmitter power control system of claim 10 wherein said gain adjuster includes:
   a first comparing circuit having a first input that communicates with said sensed signal and a second input that communicates with said first threshold; and
   a second comparing circuit having a first input that communicates with said sensed signal and a second input that communicates with said second threshold.

12. The RF transmitter power control system of claim 1 wherein said gain adjuster sequentially compares said sensed signal to first and second thresholds.

13. The RF transmitter power control system of claim 12 wherein said gain adjuster includes:
   a comparing circuit having a first input that communicates with said sensed signal;
   a threshold circuit that sequentially outputs said first and second thresholds during first and second periods to a second input of said comparing circuit; and
   a decision circuit that receives outputs of said comparing circuit during said first and second periods and that one of increases, decreases, and does not change said at least one of said gain and said output power level.

14. A radio frequency (RF) transceiver for a wireless local area network device, comprising:
   a transmitter that transmits RF signals; and
   a local RF transmitter power control system that adjusts at least one of a gain and an output power level of said transmitter based on at least one of amplitude and power of said RF signals,
   wherein said RF transmitter power control system is packet-based and wherein said RF transmitter power control system senses said one of said amplitude and said power of a first packet without adjusting said at least one of said amplitude and said power during said first packet and said RF transmitter power control system adjusts said at least one of said gain and said output power level of said transmitter for a subsequent packet based on said at least one of said sensed amplitude and said sensed power during said first packet.

15. The RF transceiver of claim 14 wherein said transmitter includes a variable gain power amplifier and wherein said RF transmitter power control system adjusts a gain of said variable gain power amplifier.

16. The RF transceiver of claim 14 wherein said RF transmitter power control system includes a sensor that detects at least one of amplitude and power of said RF signals and that generates a sensed signal, and a gain adjuster that compares said sensed signal to a threshold signal and that adjusts said at least one of said gain and said output power level of said transmitter.

17. The RF transceiver of claim 16 wherein said sensor detects an amplitude output by said transmitter and generates an amplitude signal.

18. The RF transceiver of claim 17 wherein said gain adjuster includes a comparing circuit that receives said amplitude signal and that compares said amplitude signal to said threshold signal.

19. The RF transceiver of claim 16 wherein said sensor detects power output by said transmitter and generates a power signal.

20. The RF transceiver of claim 19 wherein said gain adjuster includes a comparing circuit that receives said power signal and that compares said power signal to said threshold signal.

21. The RF transceiver of claim 16 further comprising a counter for storing a current gain of said transmitter, wherein said gain adjuster compares said sensed signal to said threshold signal and at least one of increments and decrements said counter.

22. The RF transceiver of claim 16 wherein said gain adjuster includes:
   a comparing circuit having one input that communicates with said sensed signal; and
   a threshold circuit that selects and outputs one of a first threshold value and a second threshold value for each packet to another input of said comparing circuit.

23. The RF transceiver of claim 22 wherein said threshold circuit sets said threshold signal equal to a first threshold, wherein said sensed signal is compared to said threshold signal, wherein if said sensed signal is less than said threshold signal, said at least one of a gain and an output power level is increased, and wherein if said sensed signal is greater than said threshold signal, said threshold circuit sets said threshold signal equal to a second threshold that is greater than said first threshold.

24. The RF transceiver of claim 23 wherein if said sensed signal is less than said threshold signal, said threshold circuit sets said threshold signal equal to said first threshold, and wherein if said sensed signal is greater than said threshold signal, said at least one of said gain and said output power level is increased.

25. The RF transceiver of claim 16 wherein said gain adjuster simultaneously compares said sensed signal to first and second thresholds.

26. The RF transceiver of claim 25 wherein said gain adjuster includes:
   a first comparing circuit having a first input that communicates with said sensed signal and a second input that communicates with said first threshold; and
   a second comparing circuit having a first input that communicates with said sensed signal and a second input that communicates with said second threshold.

27. The RF transceiver of claim 16 wherein said gain adjuster sequentially compares said sensed signal to first and second thresholds.

28. The RF transceiver of claim 27 wherein said gain adjuster includes:
   a comparing circuit having a first input that communicates with said sensed signal;
   a threshold circuit that sequentially outputs said first and second thresholds during first and second periods to a second input of said comparing circuit; and
   a decision circuit that receives outputs of said comparing circuit during said first and second periods and that one of increases, decreases, and does not change said at least one of said gain and said output power level.

29. A radio frequency (RF) power control system for a wireless local area network device, comprising:
transmitting means for transmitting RF signals;
sensing means for detecting at least one of amplitude and power of said RF signals and for generating a sensed signal; and
adjusting means for comparing said sensed signal to a threshold signal and for adjusting at least one of a gain and an output power level of said transmitting means,
wherein said RF transmitter power control system is packet-based and wherein said sensing means senses said one of said amplitude and said power of a first packet without adjusting said at least one of said amplitude and said power during said first packet and said adjusting means adjusts said gain of said transmitting means for a subsequent packet based on said at least one of said sensed amplitude and said sensed power during said first packet.

30. The RF transmitter power control system of claim 29 wherein said sensing means detects an amplitude output by said transmitting means and generates an amplitude signal.

31. The RF transmitter power control system of claim 30 wherein said adjusting means includes comparing means for receiving said amplitude signal and for comparing said amplitude signal to said threshold signal.

32. The RF transmitter power control system of claim 29 wherein said sensing means detects power output by said transmitting means and generates a power signal.

33. The RF transmitter power control system of claim 29 wherein said adjusting means includes comparing means for comparing said power signal to said threshold signal.

34. The RF transmitter power control system of claim 29 further comprising counting means for storing a current gain of said transmitting means, wherein said adjusting means compares said sensed signal to said threshold signal and at least one of increments and decrements said counting means.

35. The RF transmitter power control system of claim 29 wherein said adjusting means includes:
a comparing circuit having one input that communicates with said sensed signal; and
threshold means for selecting and outputting one of a first threshold value and a second threshold value for each packet to another input of said comparing circuit.

36. The RF transmitter power control system of claim 35 wherein said threshold means sets said threshold signal equal to a first threshold, wherein said sensed signal is compared to said threshold signal, wherein if said sensed signal is less than said threshold signal, said at least one of a gain and an output power level is increased, and wherein if said sensed signal is greater than said threshold signal, said threshold means sets said threshold signal equal to a second threshold that is greater than said first threshold.

37. The RF transmitter power control system of claim 36 wherein if said sensed signal is less than said threshold signal, said threshold means sets said threshold signal equal to said first threshold, and wherein if said sensed signal is greater than said threshold signal, said at least one of said gain and said output power level is increased.

38. The RF transmitter power control system of claim 29 wherein said adjusting means simultaneously compares said sensed signal to first and second thresholds.

39. The RF transmitter power control system of claim 38 wherein said adjusting means includes:
a first comparing circuit having a first input that communicates with said sensed signal and a second input that communicates with said first threshold; and
a second comparing circuit having a first input that communicates with said sensed signal and a second input that communicates with said second threshold.

40. The RF transmitter power control system of claim 29 wherein said adjusting means sequentially compares said sensed signal to first and second thresholds.

41. The RF transmitter power control system of claim 40 wherein said adjusting means includes:
a comparing circuit having a first input that communicates with said sensed signal;
threshold means for sequentially outputting said first and second thresholds during first and second periods to a second input of said comparing circuit; and
decision means for receiving outputs of said comparing circuit during said first and second periods and for one of increasing, decreasing, and not changing said at least one of said gain and said output power level.

42. A radio frequency (RF) transceiver for a wireless local area network device, comprising:
transmitting means for transmitting RF signals; and
local power control means for adjusting at least one of a gain and an output power level of said transmitting means based on at least one of amplitude and power of said RF signals,
wherein said power control means is packet-based and wherein said power control means senses said one of said amplitude and said power of a first packet without adjusting said at least one of said amplitude and said power during said first packet and said power control means adjusts said at least one of said gain and said output power level of said transmitting means for a subsequent packet based on said at least one of said sensed amplitude and said sensed power during said first packet.

43. The RF transceiver of claim 42 wherein said transmitting means includes amplifying means for providing variable gain and wherein said power control means adjusts said variable gain of said power amplifying means.

44. The RF transceiver of claim 42 wherein said power control means includes sensing means for detecting at least one of amplitude and power of said RF signals and for generating a sensed signal, and adjusting means for comparing said sensed signal to a threshold signal and for adjusting at least one of said gain and said output power level of said transmitting means.

45. The RF transceiver of claim 44 wherein said sensing means detects an amplitude output by said transmitting means and generates an amplitude signal.

46. The RF transceiver of claim 45 wherein said adjusting means includes comparing means for comparing said amplitude signal to said threshold signal.

47. The RF transceiver of claim 44 wherein said sensing means detects power output by said transmitting means and generates a power signal.

48. The RF transceiver of claim 47 wherein said adjusting means includes comparing means for comparing said power signal to said threshold signal.

49. The RF transceiver of claim 44 further comprising counting means for storing a current gain of said transmitting means, wherein said adjusting means compares said sensed signal to said threshold signal and at least one of increments and decrements said counting means.

50. The RF transceiver of claim 44 wherein said adjusting means includes:
comparing means for comparing said sensed signal to a threshold signal; and threshold means for selecting and outputting one of a first threshold value and a second threshold value for each packet to another input of said comparing means.

51. The RF transceiver of claim 50 wherein said threshold means sets said threshold signal equal to a first threshold, wherein said sensed signal is compared to said threshold signal, wherein if said sensed signal is less than said threshold signal, said at least one of a gain and an output power level is increased, and wherein if said sensed signal is greater than said threshold signal, said threshold means sets said threshold signal equal to a second threshold that is greater than said first threshold.

52. The RF transceiver of claim 51 wherein if said sensed signal is less than said threshold signal, said threshold means sets said threshold signal equal to said first threshold, and wherein if said sensed signal is greater than said threshold signal, said at least one of said gain and said output power level is increased.

53. The RF transceiver of claim 44 wherein said adjusting means simultaneously compares said sensed signal to first and second thresholds.

54. The RF transceiver of claim 53 wherein said adjusting means includes:
first comparing means for comparing said sensed signal and to said first threshold; and
second comparing means for comparing said sensed signal to said second threshold.

55. The RF transceiver of claim 44 wherein said adjusting means sequentially compares said sensed signal to first and second thresholds.

56. The RF transceiver of claim 55 wherein said adjusting means includes:
comparing means for comparing said sensed signal to said first and second threshold signals;
threshold means for sequentially outputting said first and second thresholds during first and second periods to said comparing means; and
decision means that receives outputs of said comparing means during said first and second periods for one of increasing, decreasing, and not changing said at least one of said gain and said output power level.

57. A method for controlling transmitter power for a radio frequency (RF) transmitter of a wireless local area network device, comprising:
transmitting RF signals;
detecting at least one of amplitude and power of said RF signals;
generating a sensed signal;
comparing said sensed signal to a threshold signal;
adjusting at least one of a gain and an output power level of said transmitter;
adjusting said at least one of said gain and said output power level on a packet-by-packet basis;
sensing said one of said amplitude and said power of a first packet without adjusting said at least one of said amplitude and said power during said first packet; and
adjusting said at least one of said gain and said output power level of said transmitter for a subsequent packet based on said at least one of said sensed amplitude and said sensed power during said first packet.

58. The method of claim 57 further comprising:
detecting an amplitude of said transmitter; and
generating an amplitude signal.

59. The method of claim 58 further comprising:
receiving said amplitude signal; and
comparing said amplitude signal to said threshold signal.

60. The method of claim 57 further comprising:
detecting power output of said transmitter; and
generating a power signal.

61. The method of claim 58 further comprising comparing said power signal to said threshold signal.

62. The method of claim 57 further comprising:
storing a current gain of said transmitter in a counter; and
at least one of incrementing and decrementing said counter.

63. The method of claim 57 further comprising selecting one of a first threshold value and a second threshold value for each packet.

64. The method of claim 63 further comprising:
setting said threshold signal to a first threshold;
comparing said sensed signal to said threshold signal;
increasing at least one of a gain and an output power level if said sensed signal is less than said threshold signal; and
setting said threshold signal equal to a second threshold that is greater than said first threshold if said sensed signal is greater than said threshold signal.

65. The method of claim 64 further comprising:
setting said threshold signal equal to said first threshold if said sensed signal is less than said threshold signal; and
decreasing said at least one of said gain and said output power level if said sensed signal is greater than said threshold signal.

66. The method of claim 57 further comprising simultaneously comparing said sensed signal to first and second thresholds.

67. The method of claim 57 further comprising sequentially comparing said sensed signal to first and second thresholds.

68. A method for controlling transmitter power in a radio frequency (RF) transceiver for a wireless local area network device, comprising:
transmitting RF signals;
locally adjusting at least one of a gain and an output power level of said transmitter based on at least one of amplitude and power of said transmitted RF signals;
adjusting said at least one of said gain and said output power level on a packet-by-packet basis;
sensing said one of said amplitude and said power of a first packet without adjusting said at least one of said amplitude and said power during said first packet; and
adjusting said at least one of said gain and said output power level of said transmitter for a subsequent packet based on said at least one of said sensed amplitude and said sensed power during said first packet.

69. The method of claim 68 further comprising:
providing a variable gain amplifier in said transmitter; and
adjusting said variable gain of said variable gain amplifier.

70. The method of claim 68 further comprising:
detecting at least one of amplitude and power of said RF signals;
generating a sensed signal;
comparing said sensed signal to a threshold signal; and
adjusting said at least one of said gain and said output power level of said transmitter.

71. The method of claim 70 further comprising:
detecting an amplitude output by said transmitter;
generating an amplitude signal.

72. The method of claim 71 further comprising comparing said amplitude signal to said threshold signal.

73. The method of claim 70 further comprising:
detecting power output by said transmitter; and
generating a power signal.

74. The method of claim 73 further comprising comparing said power signal to said threshold signal.

75. The method of claim 70 further comprising:
storing a current gain of said transmitter in a counter;
comparing said sensed signal to said threshold signal; and
at least one of incrementing and decrementing said counter.

76. The method of claim 68 further comprising selecting one of a first threshold value and a second threshold value for each packet.

77. The method of claim 76 further comprising:
setting said threshold signal to a first threshold;
comparing said sensed signal to a first threshold signal;
increasing at least one of a gain and an output power level if said sensed signal is less than said threshold signal; and
setting said threshold signal equal to a second threshold that is greater than said first threshold if said sensed signal is greater than said threshold signal.

78. The method of claim 77 further comprising:
setting said threshold signal equal to said first threshold if said sensed signal is less than said threshold signal; and
decreasing said at least one of said gain and said output power level if said sensed signal is greater than said threshold signal.

79. The method of claim 68 further comprising simultaneously comparing said sensed signal to first and second thresholds.

80. The method of claim 68 further comprising sequentially comparing said sensed signal to first and second thresholds.

* * * * *

UNITED STATES PATENT AND TRADEMARK OFFICE
CERTIFICATE OF CORRECTION

PATENT NO.        : 7,215,933 B1
APPLICATION NO.   : 10/253364
DATED             : May 8, 2007
INVENTOR(S)       : Lawrence Tse et al.

Page 1 of 1

It is certified that error appears in the above-identified patent and that said Letters Patent is hereby corrected as shown below:

Column 1, Line 62    Insert -- to -- after "coupled"
Column 2, Line 41    Insert -- to -- after "input"
Column 6, Line 59    Delete "update" and insert -- updated --

Signed and Sealed this

Thirtieth Day of October, 2007

JON W. DUDAS
*Director of the United States Patent and Trademark Office*